April 30, 1940.   R. H. ANDERSON   2,198,984
MOTOR STARTING ORGANIZATION AND FRICTION DISK CLUTCH FOR THE SAME
Filed March 10, 1938
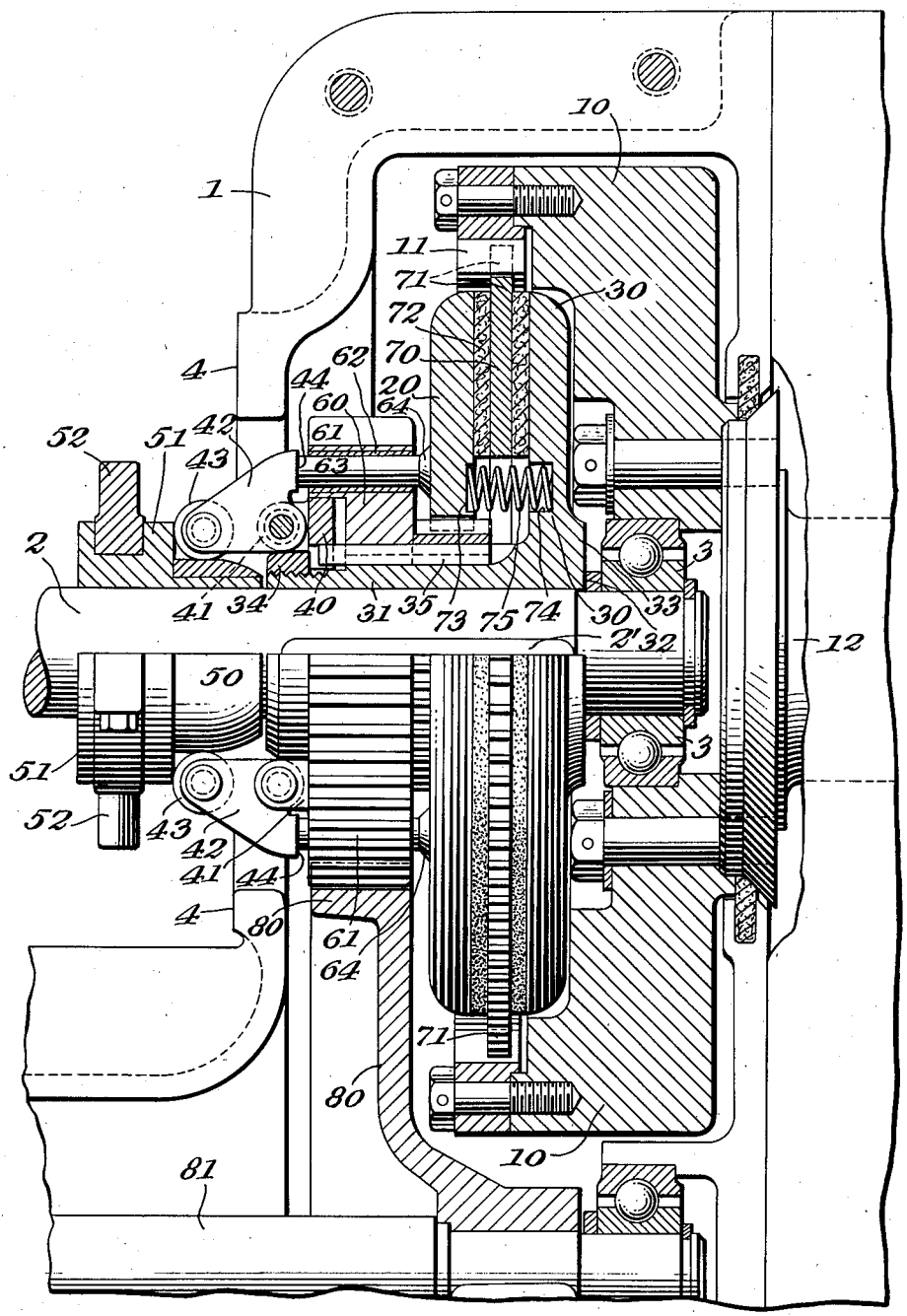
INVENTOR.
Ralph H. Anderson
BY Spear Rawlings & Spear
ATTORNEYS.

Patented Apr. 30, 1940

2,198,984

UNITED STATES PATENT OFFICE 2,198,984

MOTOR STARTING ORGANIZATION AND FRICTION DISK CLUTCH FOR THE SAME

Ralph H. Anderson, Boston, Mass., assignor to Kinney Manufacturing Company, Jamaica Plain, Mass., a corporation of Massachusetts Application March 10, 1938, Serial No. 195,078

6 Claims. (Cl. 123—179)

In the development of friction clutches the recognized trend in the art has been to multiple disk types and conspicuously to triple disk clutches in which a pair of outside plates are engaged with a center plate usually carrying facings of fabricated frictioning material. Such clutches have been variously installed and variously modified to conform to their installation.

My present improvement in such type clutch preserves the general prior art teachings, but develops a new and advantageous function in combinative relations with other mechanisms.

As an example of such adaptability I cite as part of my concept the inter-related functions of a minor starting motor with a larger or major motive shaft. Such agencies have their independent idiosyncrasies or peculiarities of initial functioning and the clutch problem is one of timely coordination. If we consider a case in which a major motive unit is to be put into rotative functioning by a smaller motor of comparable characteristics, we have a definite case of clutch function in the pick-up phases of each.

To illustrate with a practical example of clutch to motor adaptation I show in the accompanying drawing a clutch mechanism in itself very old, but with new features and improvements that give it new individual and also combinative functions.

The drawing shows a partly sectioned clutch combination of novel advantage, but in general embodying old clutch types established in engineering experience.

While adapted to various organizations I have selected for illustration its combinative possibilities as in the transmission of starting power from a small internal combustion motor to a larger heavier engine as of the Diesel type.

Referring to the drawing I have indicated at 1 a primary clutch casing having a shaft 2 rotatably supported generally axially thereof and supported at its end adjacent the starting motor as indicated at 3, to the right of the drawing. The other end of the shaft 2 is similarly supported in a cap (not shown) but bolted to the rear face 4 to the left of the casing 1.

Entered within the casing is a hollow rotatable member such as the fly wheel 10 of a starting motor having an annular ring of internal teeth 11 of sufficient tooth breadth to allow for a slight sliding engagement with peripheral exterior teeth 71 of the central or interior peripherally toothed friction disk 70 of multiple disk clutch.

The clutch which, when operated, is rotatable as a whole with the shaft 2, to which it is keyed, consists of a pair of exterior disk members 20 and 30, the latter located to the right of the shaft lies on the side toward the entrance of the fly wheel 10 of the starting motor connection 12. The member 30 carries a central tubular sleeve 31 extending in the direction opposite to the starting motor and is keyed to the shaft 2 as at 2'. The shaft 2 is supported in an inner spindle support or ball bearing 3 in a central aperture of the fly wheel 10 so that the shaft 2 is disposed axially of the drive 12 of the fly wheel 10 from the starting motor.

The sleeve 31 has threaded to its outer end (left in the drawing) an adjustment ring 34. This bears against an adjacent face of an annular slide block 40 which is keyed to the sleeve 31 in splineway 35. The slide block 40 has ears 41 between which are pivoted bell crank levers 42 which are radially disposed in their plane of movement. At their free ends the bell cranks have hardened rollers 43 which ride the incline of an operating cone 50 on a collar 51 shifted by a lever engagement with the cylindrical trunnions 52. Each of the bell crank levers 42, which act as pressure transmitting dogs for moving the clutch disk 20, has a face 44 disposed toward said disk.

On the sleeve 31 is an annular take off gear 60 which is splined in the keyway 35 and has on its periphery teeth 61. This gear is pierced by a series of holes aligned with the pressure transmitting face of each bell crank lever 42. The holes are bushed as at 62 for pins 63 which have heads 64 bearing against the disk 20. This provides for the closing thrust upon the disk 20 to engage it and the central peripherally toothed friction disk 70 with the disk 30. The disk 70 carries on its opposite faces friction surface material, usually of fabricated character, as indicated at 72.

The disk 70 and its facings 72 are annular having a central aperture through which pass expansion elements shown as springs 75 having opposite end pocketing as at 73 in the disk 20 and at 74 in the disk 30. This keeps the clutch disk members separated and out of contact.

As shown, the take-off gear 60 meshes with a gear 80 on a shaft 81 which is part of a secondary clutch system which is in advance of an engine to be started (not shown).

In operation, if we assume the rotative impulse of the indicated fly wheel 10 to be started by the originating motor through the shaft 12 until that motor is fully functioning, the first phase of the pick-up of the motor to be started is tightening of the disks 20, 30, 70 of the first friction clutch until the take-off gear 60 begins to drive the gear 80 on the starting shaft 81. This shaft may be connected up as by a second multiple disk clutch to the drive of the motor to be started which may thus be brought to its own operation smoothly and without undue strain on the primary starting motor.

While my clutch organization as before described is important in its combinative relations, its individual features make it useful in various connections, as will be apparent to those skilled in the art.

What I therefore claim and desire to secure by Letters Patent is:

1. In a friction disk clutch, a casing, a shaft rotatably mounted in said casing, an exterior disk member having an elongated central sleeve enclosing said shaft and keyed thereto, an opposite annular exterior disk member slidable on said sleeve and having a splining engagement therewith, expansion members interposed between said exterior disks for their normal separation, a plurality of radially disposed bell cranks, means for adjustably supporting said bell cranks axially of the sleeve, said cranks each including a free riding outer operating end and a pressure transmitting face of opposite urge, a cone slidably mounted on the shaft and means for moving it axially of the free riding ends of the bell cranks, a take-off pinion keyed to said forward disk sleeve, said take-off pinion having apertures disposed parallel to the shaft axis, and thrust pins in said apertures and each aligned with the pressure transmitting face of one of the radial bell cranks and having its opposite end disposed for operative thrust on the adjacent exterior clutch disk.

2. In a friction disk clutch, a casing, a shaft rotatably mounted in said casing, an exterior disk member having an elongated central sleeve enclosing said shaft and keyed thereto, a toothed ring keyed on said sleeve, means rotating said ring, an opposite annular exterior disk member slidable on said sleeve and having a splined engagement with said sleeve, expansion members interposed between said exterior disks for their normal separation, a plurality of radially disposed bell cranks, means for adjustably supporting them axially of the sleeve, said cranks each including a free riding outer operating end and a pressure transmitting face of opposite urge, a cone slidably mounted on the shaft, and means for moving it axially of the free riding ends of the bell cranks, a take-off pinion ring keyed to said forward disk sleeve in common wtih the toothed ring, said take-off pinion having apertures disposed parallel to the shaft axis, and thrust pins in said apertures and each aligned with the pressure transmitting face of one of the radial bell cranks and having its opposite end disposed for operative thrust on the adjacent exterior clutch disk.

3. In combination, a driving shaft, a shaft to be driven, and a clutch comprising a driving clutch member rotating with said driving shaft and a driven clutch member for engagement with said driving clutch member, means for relatively moving said driving and driven clutch members to bring them into clutching engagement with each other, said means including thrust transmitting means extending parallel to the longitudinal axis of said clutch members and means for moving said thrust means against one of said clutch members, and a rotation-transmitting element operatively connected with said shaft to be driven and disposed intermediate said clutch members and said means for moving said thrust transmitting means and rotated by said driven clutch member whenever said driven clutch member is clutched to said driving clutch member.

4. The combination of claim 3, said rotation-transmitting element being a gear having a plurality of apertures parallel with the movement of said clutch members, said thrust transmitting means including thrust pins in said apertures, and said means for moving said thrust means against said clutch member including a plurality of levers having pressure transmitting surfaces each adapted to contact one end of one of said thrust pins to force its other end against said driven clutch member to move it into clutching engagement with the driving clutch member.

5. In combination, a driving shaft, a shaft to be driven, and a clutch comprising a clutch shaft between said driving and driven shafts, a driving clutch member rotating with said driving shaft, a driven clutch member fast on said clutch shaft, means for relatively moving said driving and driven clutch members including thrust transmitting members extending parallel to the axis of said clutch members and means to move said thrust transmitting members against one of said clutch members to bring it into clutch engagement with the other, and a rotation-transmitting element on said clutch shaft and operatively connected with said shaft to be driven and rotated by said driven clutch member whenever said driven clutch member is clutched to said driving clutch member, said thrust member lying parallel to the longitudinal axis of said clutch shaft and having thrust receiving and transmitting surfaces one on other side of said rotation transmitting element.

6. Power transmission mechanism comprising a rotable clutch shaft, a driven clutch member fixed on said shaft, a take-off pinion fixed on said shaft, a driving clutch member movable longitudinally of said shaft, and means for moving said driving clutch member into clutching engagement with said driven clutch member, said means comprising thrust mechanism effective longitudinally of said take-off pinion and means for forcing said thrust mechanism into operative contact with said driving clutch member to move it into clutch engagement with said fixed clutch member and thereby to rotate said clutch shaft and said take-off pinion.

RALPH H. ANDERSON.